(12) United States Patent
Fethke

(10) Patent No.: US 9,926,037 B2
(45) Date of Patent: Mar. 27, 2018

(54) ELECTRIC AUXILIARY BICYCLE DRIVE

(71) Applicant: Pendix GmbH, Zwickau (DE)

(72) Inventor: Sebastian Fethke, Zwickau (DE)

(73) Assignee: Pendix GmbH, Zwickau (DE)

( * ) Notice: Subject to any disclaimer, the term of this patent is extended or adjusted under 35 U.S.C. 154(b) by 0 days.

(21) Appl. No.: 15/327,674

(22) PCT Filed: Jul. 23, 2015

(86) PCT No.: PCT/EP2015/066893
§ 371 (c)(1),
(2) Date: Jan. 20, 2017

(87) PCT Pub. No.: WO2016/012547
PCT Pub. Date: Jan. 28, 2016

(65) Prior Publication Data
US 2017/0203813 A1  Jul. 20, 2017

(30) Foreign Application Priority Data
Jul. 24, 2014 (DE) .................. 10 2014 110 427

(51) Int. Cl.
  B62M 6/55 (2010.01)
  B62M 6/45 (2010.01)
  F16D 11/00 (2006.01)
(52) U.S. Cl.
  CPC ............... B62M 6/55 (2013.01); B62M 6/45 (2013.01); F16D 11/00 (2013.01)
(58) Field of Classification Search
  CPC ........................................... B62M 6/55
(Continued)

(56) References Cited

U.S. PATENT DOCUMENTS 3,884,317 A * 5/1975 Kinzel ............... B60L 11/1801
                                                  180/206.1
6,012,538 A * 1/2000 Sonobe ................... B62M 6/45
                                                  180/206.3
(Continued)

FOREIGN PATENT DOCUMENTS

DE        196 29 788 A1    1/1998
DE    20 2008 012 877 U1   12/2008
(Continued)

OTHER PUBLICATIONS

International Search Report of PCT/EP2015/066893, dated Oct. 5, 2015.
(Continued)

Primary Examiner — Tony H Winner
(74) Attorney, Agent, or Firm — Collard & Roe, P.C.

(57) ABSTRACT

An electric auxiliary drive for bicycles includes an electric motor having a stator which is connected to a bicycle frame. A rotor is connected to a rotatable part of a bottom bracket of a bicycle on a left-hand side in a direction of travel. The rotor has a magnet. A control device adjusts the power of the electric motor with a control circuit arrangement. A torque sensor is connected to the control circuit arrangement. The rotor is arranged in a co-rotating housing which is connected to a pedal crank and which is arranged on a bottom bracket shaft in an interlocking manner. The stator is arranged in a housing connected to the bicycle frame and secured against rotation.

2 Claims, 1 Drawing Sheet

Direction of travel

(58) Field of Classification Search
USPC .................................................. 180/206.4
See application file for complete search history.

(56) References Cited

U.S. PATENT DOCUMENTS

| | | | |
|---|---|---|---|
| 6,672,418 B1* | 1/2004 | Makino | B62M 6/45 180/206.3 |
| 9,758,212 B2* | 9/2017 | Kimmich | B62M 6/55 |
| 2011/0180341 A1* | 7/2011 | Chan | B62M 6/55 180/206.4 |
| 2013/0162112 A1 | 6/2013 | Loefel et al. | |
| 2013/0277131 A1* | 10/2013 | Becker | B62M 6/55 180/206.4 |
| 2014/0305727 A1* | 10/2014 | Gao | B62K 19/34 180/206.4 |
| 2016/0332696 A1* | 11/2016 | Spaggiari | B62M 6/55 |
| 2017/0267314 A1* | 9/2017 | Liang | B62M 6/55 |

FOREIGN PATENT DOCUMENTS

| | | |
|---|---|---|
| DE | 10 2010 017 829 A1 | 10/2011 |
| DE | 20 2010 017 366 U1 | 10/2011 |
| DE | 10 2010 026 404 A1 | 1/2012 |
| DE | 20 2014 101 640 U1 | 4/2014 |
| DE | 10 2014 104 957 A1 | 10/2014 |
| EP | 2 216 242 A1 | 8/2010 |

OTHER PUBLICATIONS

German Search Report dated Mar. 18, 2015 in German Application No. 10 2014 110 427.7 with English translation of relevant parts.

* cited by examiner

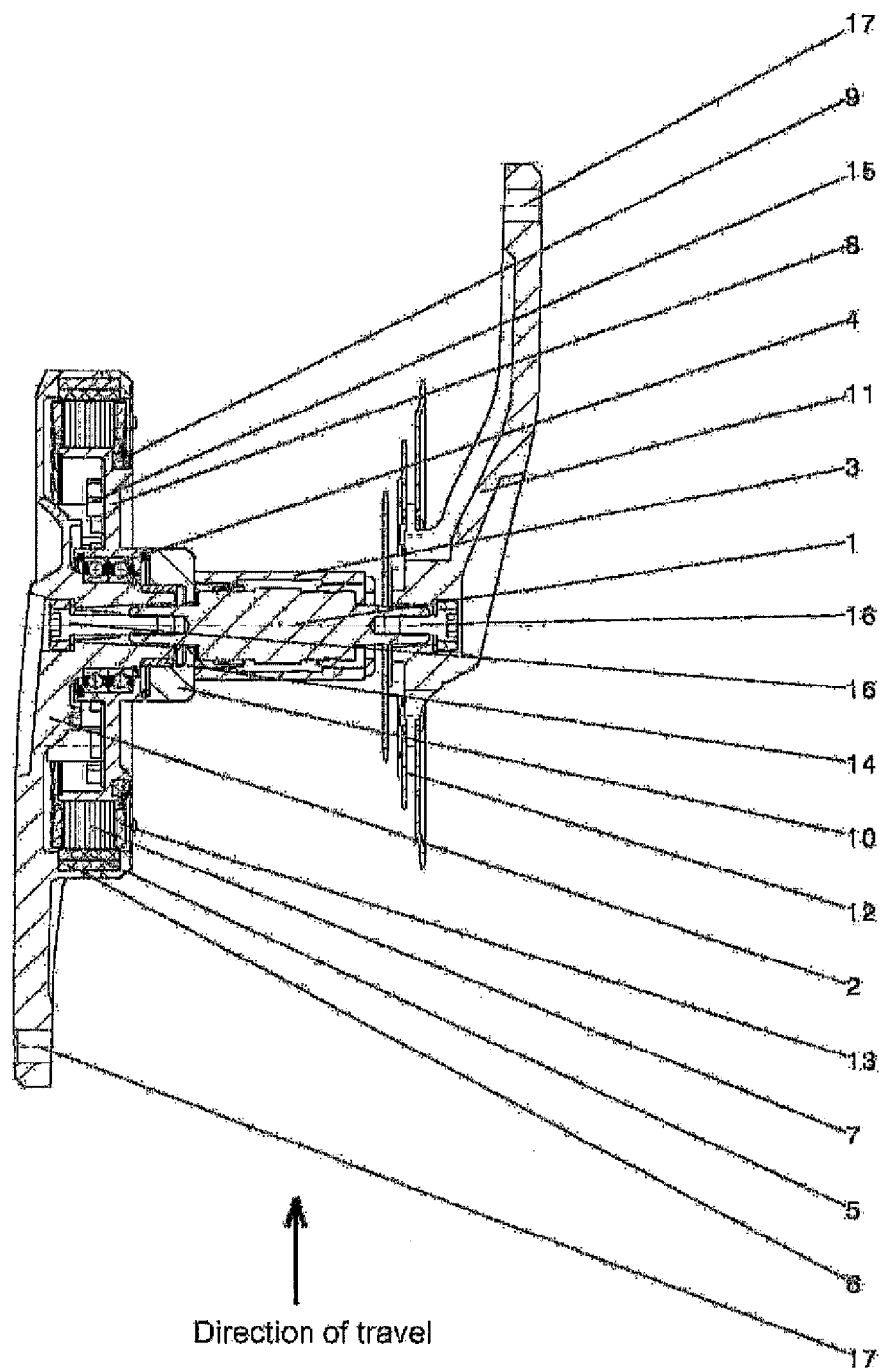

ELECTRIC AUXILIARY BICYCLE DRIVE

CROSS REFERENCE TO RELATED APPLICATIONS

This application is the National Stage of PCT/EP2015/066893 filed on Jul. 23, 2015, which claims priority under 35 U.S.C. § 119 of German Application No. 10 2014 110 427.7 filed on Jul. 24, 2014, the disclosure of which is incorporated by reference. The international application under PCT article 21(2) was not published in English.

The invention relates to an electric bicycle auxiliary drive. The invention is used in bicycles which have an auxiliary drive which acts so as to assist muscle power or independently of the pedals depending on a suitable parameter, for example the crank power exerted on the force transmission.

Various designs of auxiliary drives of this kind are known. Wheel hub motors provide the advantage that recuperation, that is to say energy recovery, can be performed, for example when travelling uphill. Bottom bracket motors have the advantage that they act directly on the crank drive and therefore can be effective in a large torque range by means of the circuit which is present on the bicycle in any case. Bottom bracket motors further have the advantage that a conventional bicycle can be retrofitted with a bottom bracket motor more easily than with a wheel hub motor since it is necessary for in each case at least one wheel on a conventional bicycle to be completely replaced and for cables for motor control and power supply to the motor to be laid when using a wheel hub motor. In addition, routing cables to the rechargeable battery and to the control and operating device has proven relatively complicated. A known electric auxiliary drive motor for a bicycle, which electric auxiliary drive motor is arranged on the bottom bracket, is described in DE 10 2010 026 404 A1, it being possible for this electrical auxiliary drive motor to be retrofitted and to be used on any conventional bicycle without a great deal of conversion work. In this case, the known auxiliary drive motor which can be retrofitted is intended to be particularly robust and low-maintenance and therefore should be able to be produced in a simple and therefore cost-effective manner. The known auxiliary drive motor for a bicycle comprises a stator and a rotor which are both arranged in a common housing. The stator can be connected to a conventional bicycle frame by means of the housing. The rotor is formed by permanent magnets and, according to the invention, can be connected to a rotatable part of a bottom bracket. The permanent magnets are mounted on a rotor lamination which is rotatably mounted in the housing and which at the same time forms a magnetic return path across the housing. The rotor lamination, together with the housing, forms an inherently closed auxiliary drive motor unit. The housing of the auxiliary drive motor can be fastened to the bicycle frame by means of a clamping connection or screw connection. It goes without saying that a torque support is intended to be realized in a known manner in the process. The rotor can be connected to a bottom bracket shaft as a rotating part of the bottom bracket. To this end, the auxiliary drive motor could be arranged on that side of the bicycle frame which is opposite the chain ring and a connection to the bottom bracket shaft could be created in a suitable manner. The housing and the rotor lamination have to be adapted in a corresponding manner. The known auxiliary drive motor further comprises a sensor for detecting the torque which acts on the pedal crank and comprises a control or regulation unit, which is integrated into the housing, for controlling the power output of the motor depending on the applied torque.

The advantages of the known solution are, in particular, that use on any conventional bicycle is possible without replacing one or more components. Furthermore, it is considered to be advantageous that a particularly good degree of efficiency of the motor in conjunction with the circuit which is present on the bicycle can be achieved by arranging the auxiliary drive motor on the bottom bracket of the bicycle.

The invention is based on the object of improving electric auxiliary drives of this kind in respect of simple production and the ability to retrofit them.

The object is achieved by a bicycle auxiliary drive according to Claim 1 which comprises an electric motor which is arranged on the left-hand side in the direction of travel and has a stator which is connected to a bicycle frame and has a rotor which is connected to a rotatable part of a bottom bracket of a bicycle and which has one or more permanent magnets, and comprises a control device for adjusting the power of the electric motor with a control circuit arrangement and an actual value sensor, which is connected to the control circuit arrangement, for detecting the torque which acts on the rotatable part of the bottom bracket. The rotor is arranged in a co-rotating housing which is connected to a pedal crank and which is arranged on a bottom bracket shaft in an interlocking manner. The stator is arranged in a housing which is connected to the bicycle frame and which is secured against rotation and which has an elastic sealing ring in relation to the co-rotating housing of the rotor. The control circuit arrangement is arranged in the interior of the stator housing. The stator housing is connected to the bicycle frame by means of a claw clutch which is screwed to a bottom bracket housing and has an elastic and play-free intermediate element. The control device serves to adjust the motor power of the electric motor, so that the total power which acts on the rotatable part of the bottom bracket and is made up of motor power and muscle power which is exerted onto the conventional crank drive is increased.

The invention is formed in an advantageous manner by the rotor housing being mounted on the stator housing by means of a deep-groove ball bearing.

A preferred exemplary embodiment of a bicycle auxiliary drive according to the invention will be explained in greater detail below with reference to the drawing which shows, in the single FIGURE, a sectional illustration of a bicycle drive.

The illustrated embodiment of an electric bicycle auxiliary drive according to the invention comprises a standard bottom bracket 1 which is arranged in a bottom bracket housing 3 which, in a known manner, is constituent part of a bicycle frame. A chain wheel set 12, in this case of triple configuration, with a right-hand-side pedal crank 11, which has a pedal eye 17 at the distal end, is arranged in an interlocking manner and fastened in a known manner by means of a first central screw connection 16 on the right-hand side of the bottom bracket journal in the direction of travel, said bottom bracket journal, which is not explicitly illustrated, however being familiar to a person skilled in the art when designed, for example, as a square. A rotor housing in the form of a rotor bell 2 is arranged in an interlocking manner and fastened by means of a second central screw connection 16 on the left-hand side of the corresponding bottom bracket journal in the direction of travel. The rotor bell 2 comprises the left-hand pedal crank, which is provided with a pedal eye 17 at the distal end, by the rotor bell 2 and the pedal crank being produced as a moulded part. A stator housing 8 is connected to the bottom bracket housing 3, wherein the stator housing 8 is secured against rotation. Connection is performed by means of a claw clutch 10, the stator-end claws of the said claw clutch being integrally formed in the stator housing 8. The claw clutch 10 is screwed into the bottom bracket housing 3, the right-handed thread of the bottom bracket housing 3 which is present on the left-hand side being used for this purpose. The claw clutch 10 therefore replaces the left-hand-side threaded ring of the standard bottom bracket 1. The said claw clutch has an elastic and play-free intermediate element 14 which ensures a rotationally elastic, angularly and longitudinally flexible connection. The claw clutch 10 absorbs the torque of the stator housing 8 and therefore renders any other torque support, for example in the form of a saddle tube claw, superfluous. The rotor bell 2 comprises, apart from the integrally formed pedal crank, a flat bottom piece and an edge region. The inner surface of the edge region is fitted with a magnetic return path ring 6 for carrying the magnetic flux of permanent magnets 5 which are arranged over the circumference of its inner surface. The permanent magnets 5 are in operative contact with stator magnets which comprise an annular stator laminated core 7, which is connected to the stator housing 8, and stator windings 13 which are arranged on it. A control circuit arrangement 15 is arranged on an advantageously annular printed circuit board in the interior of the stator housing 8. The control circuit processes actual value data from a torque and cadence sensor, not illustrated, which acts on the shaft of the standard bottom bracket 1, and controls the power consumption by the stator windings 13. The rotor bell 2 runs around the stator housing 8 on a deep-groove ball bearing 4. In order to seal off the motor interior from dirt and moisture, the stator housing 8 is provided with an elastic rubber V-sealing ring 9 which is arranged opposite the edge of the rotor bell 2.

LIST OF REFERENCE SYMBOLS

1 Standard bottom bracket
2 Rotor bell with pedal crank on the left-hand side
3 Bottom bracket housing
4 Deep-groove ball bearing
5 Permanent magnet(s)
6 Magnetic return path ring
7 Stator laminated core
8 Stator housing
9 V-sealing ring
10 Claw clutch
11 Pedal crank on the right-hand side
12 Chain wheel set
13 Stator winding(s)
14 Intermediate element
15 Control circuit
16 Crank screw connection
17 Pedal eye

The invention claimed is:

1. An electric bicycle auxiliary drive comprising:
an electric motor which is arranged on a left-hand side in a direction of travel and has a stator which is connected to a bicycle frame and has a rotor which is connected to a rotatable part of a bottom bracket of a bicycle and which has one or more permanent magnets,
a control device for adjusting a power of the electric motor with a control circuit arrangement, and
a torque sensor connected to the control circuit arrangement and for detecting a torque which acts on the rotatable part of the bottom bracket,
wherein the rotor is arranged in a co-rotating housing which is connected to a pedal crank and which is arranged on a bottom bracket shaft in an interlocking manner,
wherein the stator is arranged in a housing which is connected to the bicycle frame and which is secured against rotation and which has an elastic sealing ring in relation to the co-rotating housing of the rotor,
wherein the control circuit arrangement is arranged in an interior of the stator housing, and
wherein the stator housing is connected to the bicycle frame via a claw clutch which is screwed to a bottom bracket housing and has an elastic and play-free intermediate element.

2. The electric bicycle auxiliary drive according to claim 1, wherein the rotor housing is mounted on the stator housing via a deep-groove ball bearing.

* * * * *